US006067390A

United States Patent [19]

Hames et al.

[11] Patent Number: 6,067,390

[45] Date of Patent: May 23, 2000

[54] AMBIENT LOAD WAVEGUIDE SWITCH

[75] Inventors: Peter S. Hames, South Pasadena; Neil E. Bucknam, Northridge; Ira Lehman, Burbank, all of Calif.

[73] Assignees: PRC Inc., McLean, Va.; Modern Technologies Corp., Dayton, Ohio

[21] Appl. No.: 09/088,092

[22] Filed: Jun. 1, 1998

[51] Int. Cl.$^7$ .......... G02B 6/26

[52] U.S. Cl. .......... 385/23

[58] Field of Search .......... 385/16–23, 147, 385/88

[56] References Cited

U.S. PATENT DOCUMENTS

| | | | |
|---|---|---|---|
| 3,617,960 | 11/1971 | Lavedan, Jr. | 333/239 |
| 3,969,627 | 7/1976 | Heisner et al. | 378/61 |
| 5,175,516 | 12/1992 | Walsh et al. | 333/22 F |
| 5,246,095 | 9/1993 | Barnhill, III | 74/412 TA |

*Primary Examiner*—Akm E. Ullah
*Attorney, Agent, or Firm*—Lowe Hauptman Gopstein Gilman & Berner

[57] ABSTRACT

These and other objects of the present invention are provided by an ambient load waveguide switch mounted between a feed horn and a low noise amplifier in a ground based antenna. The ambient load waveguide switch includes a housing assembly having a through path. A shuttle assembly is positioned within the housing assembly and moves linearly within the housing assembly on a guide assembly between a first position and a second position. In the first position, the shuttle assembly has a waveguide alignable with the through path of the housing assembly. In a second position, the shuttle assembly has an ambient load element alignable with the through path of the housing assembly. A motor assembly moves the shuttle assembly in a first direction and compresses a first spring to bias the shuttle assembly into the first position. The motor assembly moves the shuttle assembly in a second direction and compresses a second spring to bias the shuttle assembly into the second position. There are horizontal and vertical alignment mechanisms for accurately and repeatedly positioning the waveguide and the ambient load cell in the first and second position, respectively. Advantageously, the guide assembly is relatively flexible resulting in long life and infrequent calibration. The waveguide provides a straight line path and is under two inches in length.

19 Claims, 6 Drawing Sheets

AMBIENT LOAD WAVEGUIDE SWITCH

FIELD OF THE INVENTION

The present invention relates generally to ground based antennas, and more specifically, to an ambient load waveguide switch used for calibrating a low noise amplifier in a deep space ground based antenna.

BACKGROUND OF THE INVENTION

There is a system of three ground based antennas mounted on the surface of the earth which receive signals from deep space. These signals are transmitted by spacecraft orbiting bodies such as the Saturn or Mars. NASA is always trying to improve the performance of the system of ground based surface antennas. Presently, signals are transmitted from the earth to the spacecraft using an x-band uplink and signals are transmitted from the spacecraft to the ground based surface antennas on earth using an x-band down link. The x-band is at microwave frequency.

The x-band down link signal is focused by the antenna into a feed horn. The feed horn further focuses the signal into a rotating waveguide ambient load switch. The rotating waveguide ambient load switch has two positions. In the first position, the feed horn focuses the signal into a choke (also called a waveguide). The signal then passes through the choke into a low noise amplifier. The low noise amplifier is cryogenically cooled and includes an oscillating crystal for tuning to the frequency of the signal transmitted by the spacecraft. In the second position, a load element is used to calibrate the low noise amplifier.

As the signal passes from space through the earth's atmosphere, background noise is added to the signal received by the system of antennas because the atmosphere has a background amount of radiation. The background noise can be approximated and removed or filtered from the received signal by tuning the receiver in the ground based equipment to account for the background noise. The amount of background noise is variable and is based primarily on atmospheric conditions such as temperature. By filtering out background noise, data rates can be increased.

A load element simulates the amount of background noise used for calibrating the low noise amplifier. The load element has a known calibrated radiation temperature; at a certain temperature the load element has a predetermined amount of radiation. By knowing the temperature of the atmosphere or sky, the temperature of the load element can be monitored to calibrate the noise generated by the atmosphere in order to filter or effectively remove the background noise generated by the atmosphere by auxiliary instrumentation. The low noise amplifier may need to be calibrated three times per day to receive signals from different spacecraft.

Thus, the ambient load waveguide switch can be moved to either of two positions. In the first position, microwave signals are allowed to pass through a waveguide port in the switch from the feed horn to the low noise amplifier when the antenna is configured to receive signals from spacecraft. In the second position, a load element is inserted into the path before the low noise amplifier in order to calibrate the amplifier.

Unwanted additional noise is added by prior art rotating waveguide ambient load switches if the choke is not accurately and repeatedly positioned. Improper calibration results as well if the load element is not accurately and repeatedly positioned. Prior art ambient load waveguide switches disadvantageously added noise because the prior art switches had a long and tortuous signal path. Prior art ambient load waveguide switches typically have through paths of approximately ten inches. Further disadvantages of prior art ambient load switches are that the choke and load element cannot be accurately and repeatedly positioned to enable the ambient load element switches to handle the high data rates now required.

SUMMARY OF THE INVENTION

It is, therefore, an object of the present invention to provide an ambient load element waveguide switch in which a waveguide mounted in the ambient load element waveguide switch has a minimum length.

It is another object of the present invention to provide an ambient load waveguide switch in which a waveguide mounted in the ambient load waveguide switch has a straight line path.

Another object of the present invention is to accurately and repeatedly position a waveguide mounted in the ambient load waveguide switch.

It is yet another object of the present invention to provide an ambient load waveguide switch which can receive higher data rate signals.

Yet a further object of the present invention is to accurately and repeatedly position the ambient load element mounted in the ambient load waveguide switch.

Yet a further object of the present invention is to provide an ambient load waveguide switch which requires infrequent adjustment.

Yet another object of the present invention is to minimize noise added to the received signal by the ambient load waveguide switch.

Yet a further object of the present invention is to be able to accurately position the waveguide and ambient load element in the X, Y and Z directions in the ambient load waveguide switch.

These and other objects of the present invention are provided by an ambient load waveguide switch mounted between a feed horn and a low noise amplifier in a ground based antenna. The ambient load waveguide switch includes a housing assembly having a through path. A shuttle assembly is positioned within the housing assembly and moves linearly within the housing assembly on a guide assembly between a first position and a second position. In the first position, the shuttle assembly has a waveguide alignable with the through path of the housing assembly. In a second position, the shuttle assembly has an ambient load element alignable with the through path of the housing assembly. A motor assembly moves the shuttle assembly in a first direction and compresses a first spring to bias the shuttle assembly into the first position. The motor assembly moves the shuttle assembly in a second direction and compresses a second spring to bias the shuttle assembly into the second position. There are horizontal and vertical alignment mechanisms for accurately and repeatedly positioning the waveguide and the ambient load cell in the first and second position, respectively. Advantageously, the guide assembly is relatively flexible resulting in long life and infrequent calibration. The shuttle assembly includes bushings with a clearance between the shuttle assembly and each of the bushings. O-rings are mounted in each of the clearances. The use of o-rings and relatively flexible guides allows the shuttle assembly to be accurately and repeatedly positioned. The waveguide provides a straight line path and is under two inches in length.

The foregoing objects are also achieved by a switch assembly which includes a housing assembly having a through path. A shuttle assembly is positioned in the housing assembly. The shuttle assembly has a waveguide and a load element. The shuttle assembly is movable between a first position where the waveguide of the shuttle assembly is aligned with the through path of the housing assembly and a second position where the ambient load element is aligned with the through path of the housing assembly. A motor assembly is operatively connected to the shuttle assembly by a linear movement device for moving the shuttle assembly between the first position and the second position.

The foregoing objects are also achieved by a method of positioning a switch in a first position and a second position. The method includes compressing a first spring to bias a shuttle assembly into the first position against a first vertical stop and a first horizontal stop. A second spring is compressed to bias the shuttle assembly into the second position against a second vertical stop and a second horizontal stop.

Still other objects and advantages of the present invention will become readily apparent to those skilled in the art from following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

Figure 1:
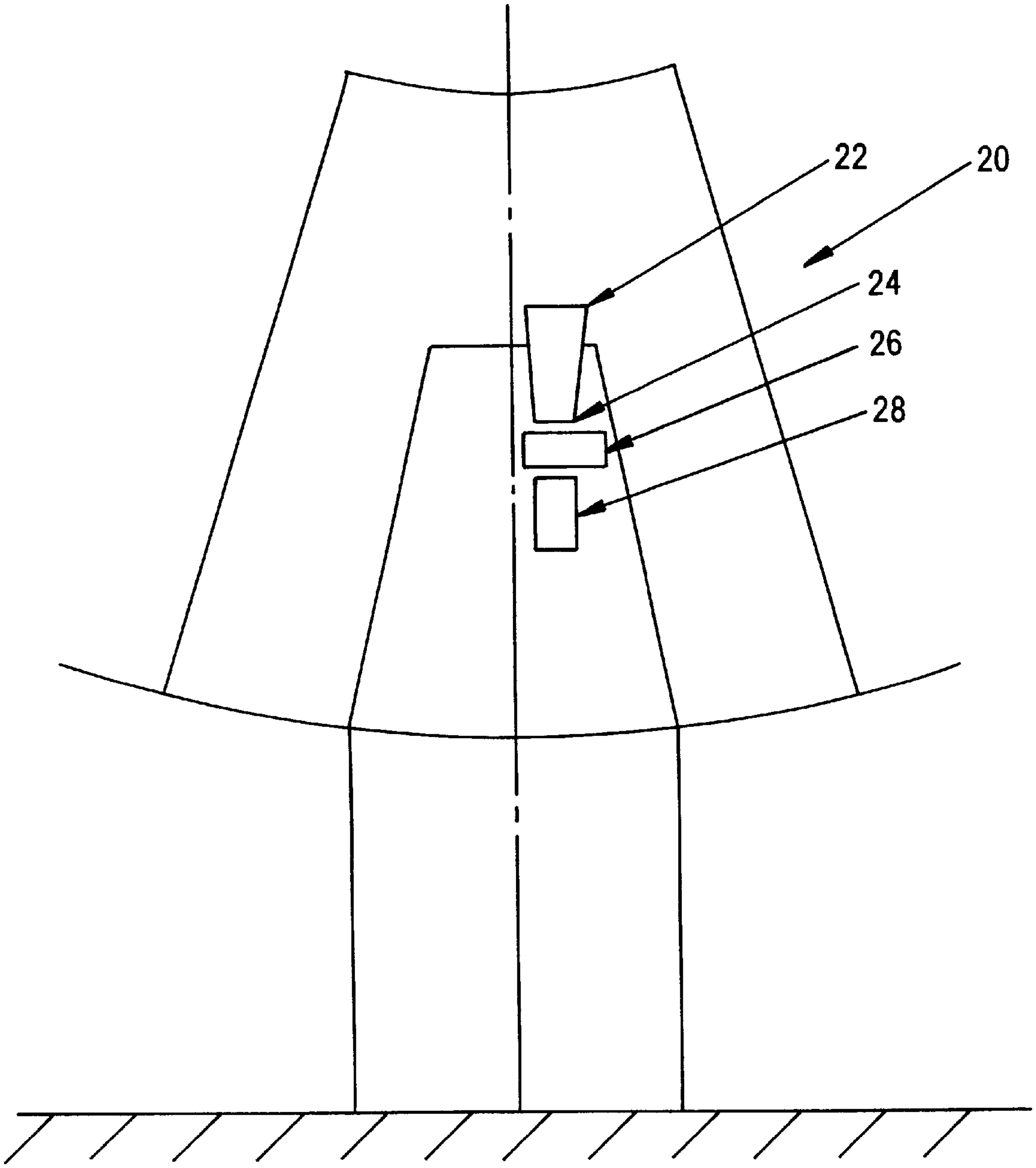
FIG. 1 is a block diagram schematic of a ground based antenna including an ambient load waveguide switch according to the present invention.

Refer now to FIG. 1 where an antenna 20 using an ambient load waveguide switch 26 according to the present invention is depicted. The antenna 20 reflects the signal sent from a spacecraft into a feed horn 22 in a known manner. The feed horn 22 is a cone about fifteen inches in diameter at the widest end and about three inches in diameter at the throat 24. The feed horn focuses the radio frequency (RF) energy into a low noise amplifier 28 through the ambient load waveguide switch 26 as explained in detail below. The antenna 20 includes uplink and downlink feed cones for transmitting and receiving signals. The present invention is only concerned with the downlink for receiving signals transmitted by spacecraft. One side of the ambient load switch 26 according to the present invention is mounted adjacent the throat 24 of the feed horn 22. The low noise amplifier 28 is mounted on the opposite side of the ambient load switch 26.

Figure 3:
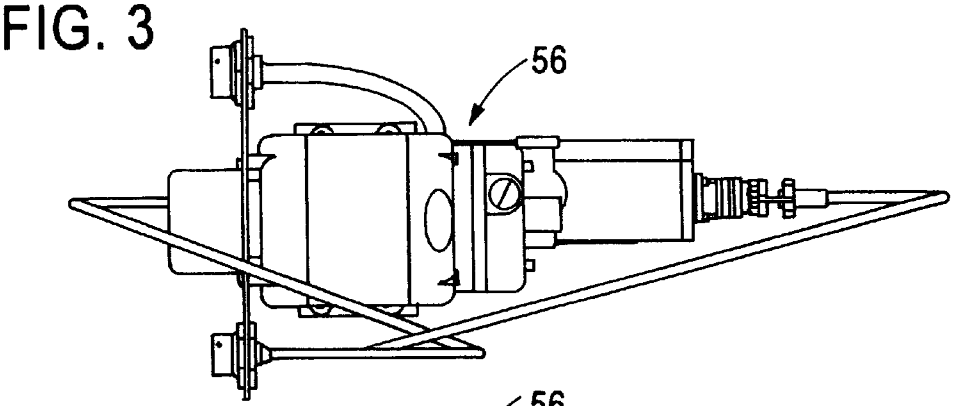
FIG. 3 is an end elevational view of the ambient load waveguide switch of FIG. 2.
Figure 2:
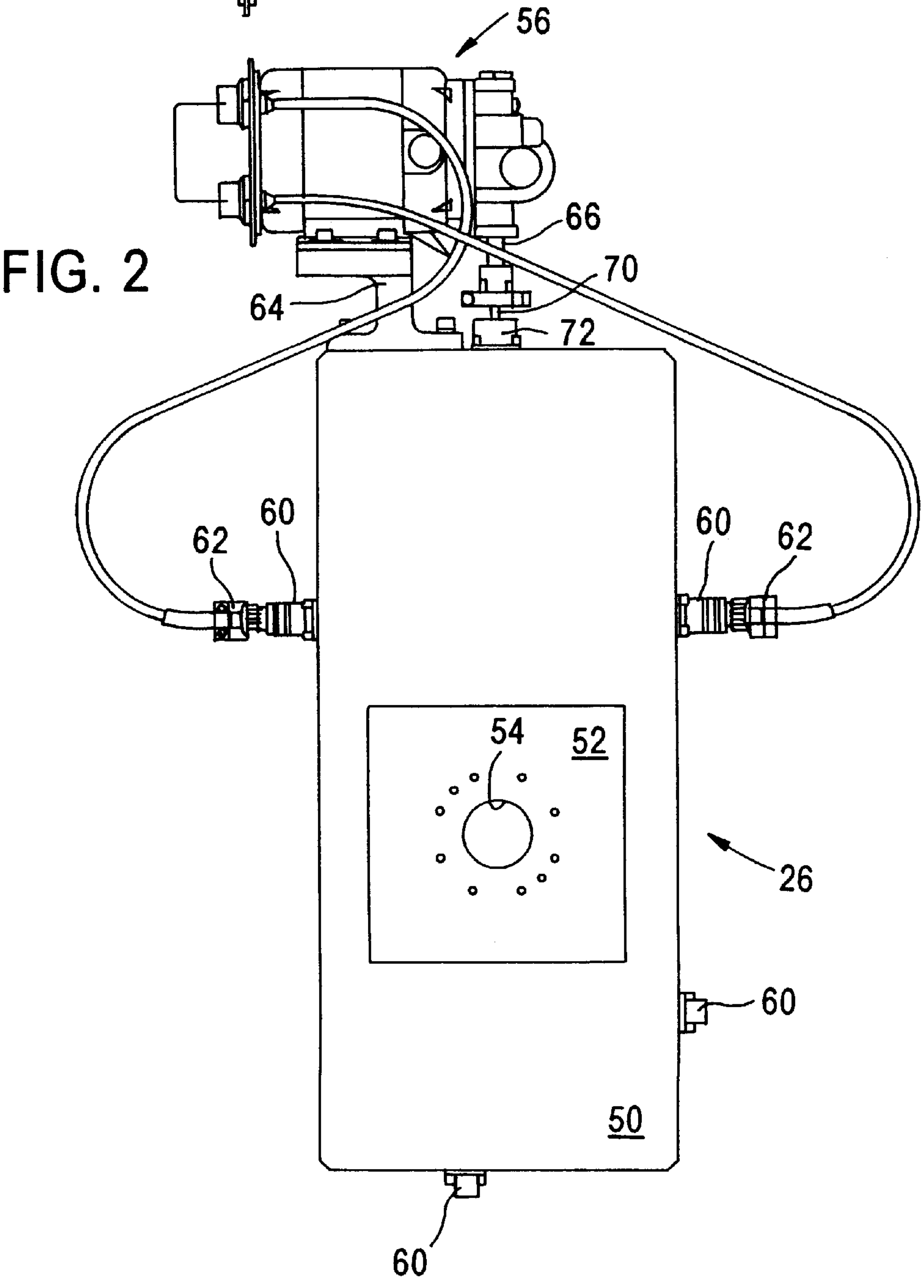
FIG. 2 is a bottom plan view of the ambient load waveguide switch according to the present invention.
Figure 4:
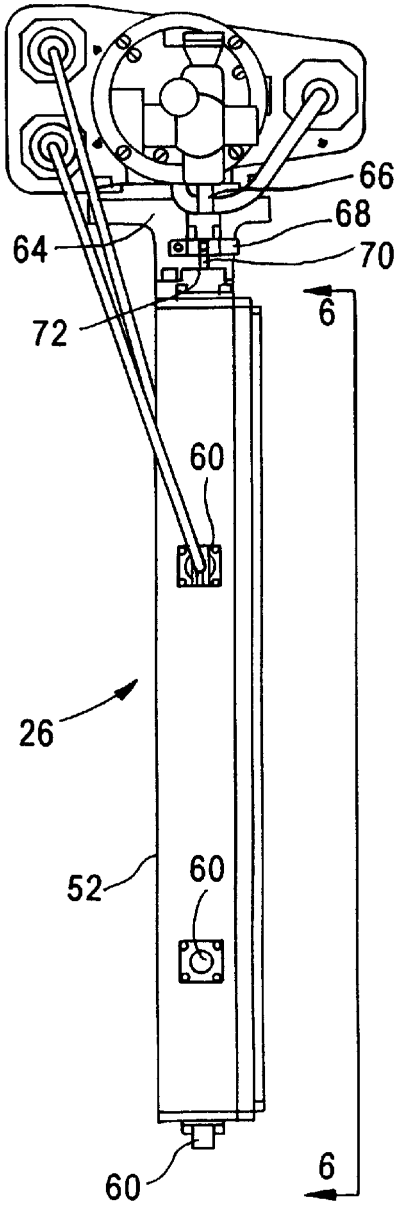
FIG. 4 is a side elevational view of the ambient load waveguide switch of FIG. 2.

The exterior of the ambient load waveguide switch 26 of the present invention is depicted in detail in FIGS. 2–4. The ambient load waveguide switch 26 includes a housing assembly generally indicated as housing assembly 50. Housing assembly 50 includes a rectangular housing 102 and a raised flange 100. A bottom raised flange 52 is one side of the housing 102 and is bolted to the low noise amplifier 28 (see FIG. 1). Flange 52 includes a circular opening 54. Opening 54 is aligned with an opening in low noise amplifier 26 (not shown). A motor assembly 56 is bolted to housing 102 on one end thereof. A plurality of electrical connectors 60 are bolted to the housing 102 and extend into the interior of the housing 102. Electrical cables extend from motor assembly 56 and have connectors 62 connected to connectors 60. A motor shaft 66 extends from motor assembly 56 into one side of a hub assembly 68. A ball screw 70 has one end thereof extending into the opposite side of the hub assembly 68. A raised flange 72 is on the housing assembly 50. The ball screw 70 extends through the flange assembly 72 into housing 102 as will be described in greater detail below.

Figure 5:
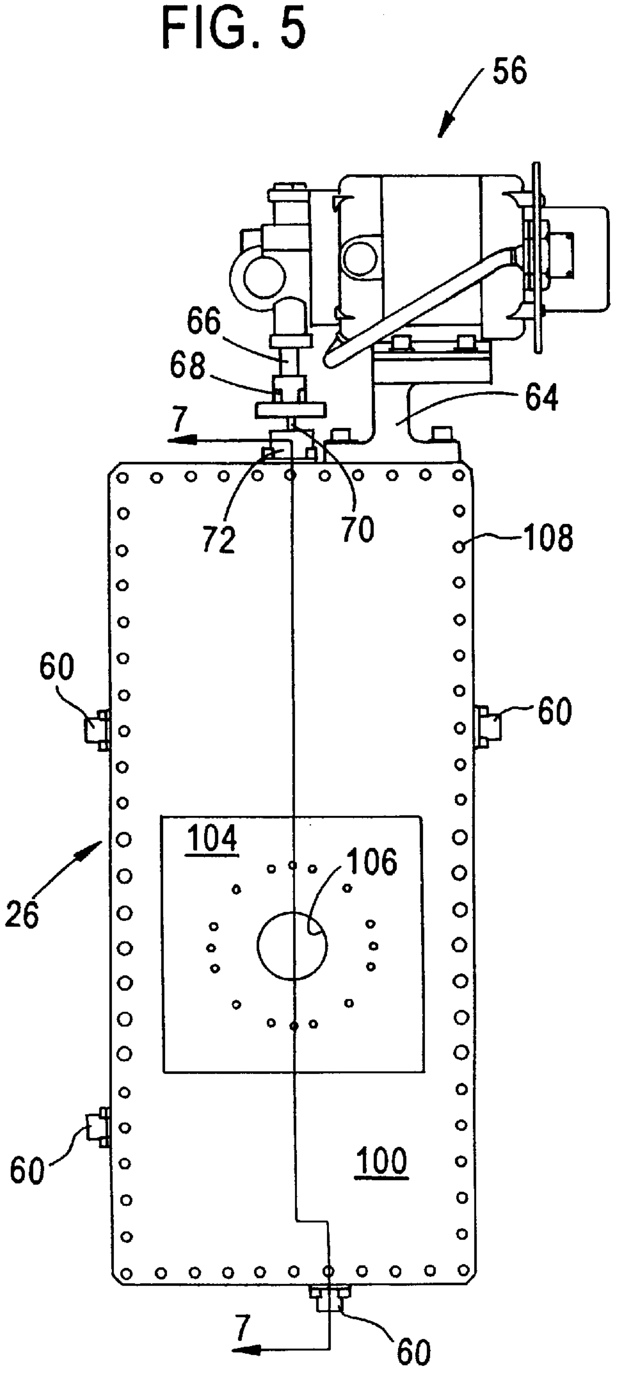
FIG. 5 is a top plan view of the ambient load waveguide switch.

In FIG. 5, the ambient load waveguide switch 26 is depicted with a top cover 100 bolted to a housing 102. A raised flange 104 is on top cover 100. Similarly, the bottom raised flange is on the housing 102. A circular opening 106 extends through the top access plate 104 and is aligned with the opening 54 in bottom flange 52. Together, openings 54 and 106 define a through path through the housing 102. A plurality of bolts 108 are used around the periphery of the top cover 100 to bolt the top cover 100 to the housing 102.

Although not shown in the Figures, the ambient load waveguide switch 26, when assembled, forms a sealed assembly. An o-ring seals the cover 100 to the housing assembly 50. There is also a shaft seal on the ball screw 70 where it penetrates the housing 102. There are also gaskets between each of the electrical connectors 62 and the housing 102. All screw holes in the housing 102 are blind tapped holes from the inside of the body. The purpose of these seals is to allow the inside of the switch 26, including the waveguide path, as well as the connecting external waveguide, to be pressurized with dry nitrogen. The purpose of this pressurization is to keep external air containing moisture from entering the waveguide. The moisture can, over time, oxidize the internal copper and aluminum surfaces of the waveguide, leading to a loss of performance.

Figure 6:
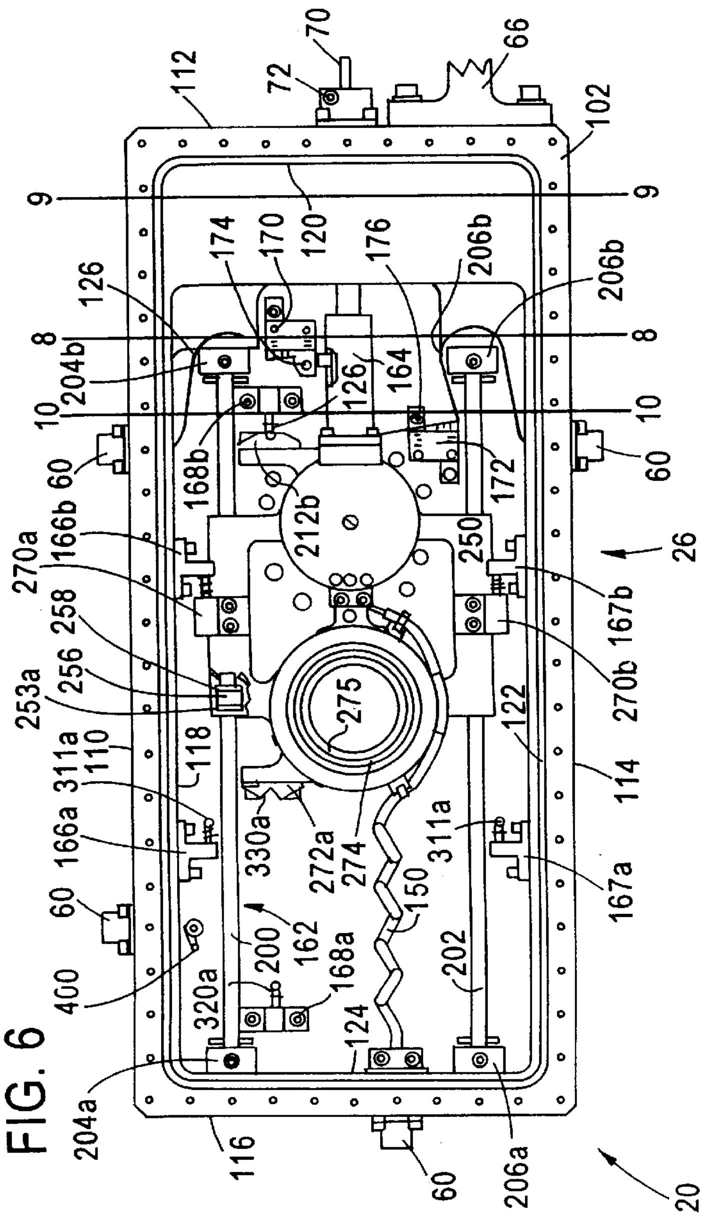
FIG. 6 is a top plan view taken along line 6—6 of FIG. 4 with the cover removed for clarity.

The ambient load waveguide switch 26, according to the present invention, is depicted in FIG. 6 with the top cover 100 removed. Housing 102 has a first longitudinally extending outer surface I 10, a second transversely extending outer surface 112, a third longitudinally extending outer surface 114, a fourth transversely extending outer surface 116, a first longitudinally extending inner surface 118, a second transversely extending inner surface 120, a third longitudinally extending inner surface 122, a fourth transversely extending inner surface 124, a first shoulder 126, a second shoulder 128, a longitudinally extending through bore 130 extending from the second outer surface 112 through to an inner recess defined by the housing 102. The through bore 130 is located between the first and second shoulders 126 and 128, respectively. A bottom surface 134 of housing 102 is defined between surfaces 118, 120, 122, 124. The inner recess forms a closed chamber defined by the housing 102 and the top cover 100.

Figure 7:
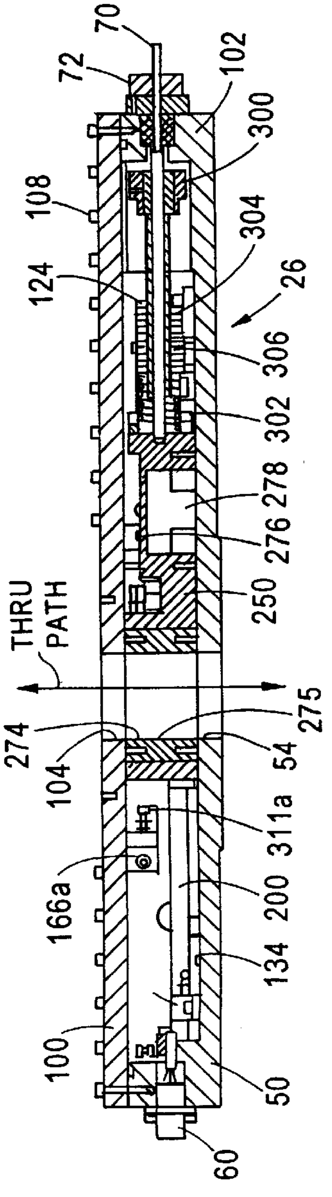
FIG. 7 is a cross-sectional side elevational view taken along line 7—7 of FIG. 5.

A shuttle assembly 160 is positioned within the recess defined by the housing 102. The shuttle assembly 160 is positioned on a shuttle support assembly 162 and is movable thereon into two positions where a waveguide and a load cell can be positioned in the through path defined by housing assembly 50 as depicted in FIG. 7.

Returning to FIG. 6, a cylindrical mount ball nut assembly 164 surrounds a portion of ball screw 70 and is connected at one end thereof to shuttle assembly 160. Two vertical locators 166*a* and 166*b* are bolted to the first inner surface 118 and two vertical locators 167*a* and 167*b* are bolted to the third inner surface 122, respectively. A left horizontal stop 168*a* and a right horizontal stop 168*b* are bolted to the bottom surface 134 of housing 102. For convenience, terms such as "left", "right", "above" and "below" are used, although these terms are to be construed in the relative sense. A limit switch 170 is bolted to the bottom surface 134 of housing 102 to limit travel in the right direction as depicted in Figure 6. A limit switch 172 is bolted to the bottom surface 134 to limit travel in the left direction as depicted in FIG. 6. Limit switch actuators 174, 176 are attached to mount ball nut assembly 164 to turn off motor assembly 56 and limit the travel of shuttle assembly 160 in the lateral direction.

Shuttle support assembly 162 includes a pair of elongated cylindrical guide rails 200, 202. Guide rail 200 extends parallel to first inner surface 118 and is constrained at opposite ends thereof by mounting blocks 204*a*, 204*b*. Mounting block 204*a* is bolted to the fourth inner surface 124 and the mounting block 204*b* is bolted to first shoulder 126. Guide rail 202 extends parallel to the guide rail 200 and parallel to third inner surface 122 and is constrained at opposite ends thereof by mounting blocks 206*a* and 206*b*. Mounting block 206*a* is bolted into the fourth inner surface 124 and mounting block 206*b* is bolted into the second shoulder 128. Guide rails 200, 202 extend parallel to each other and are relatively flexible and can bend during movement and alignment of shuttle assembly 160. Opening 106 is aligned with the throat 24 in the feed horn 22.

Figure 6A:
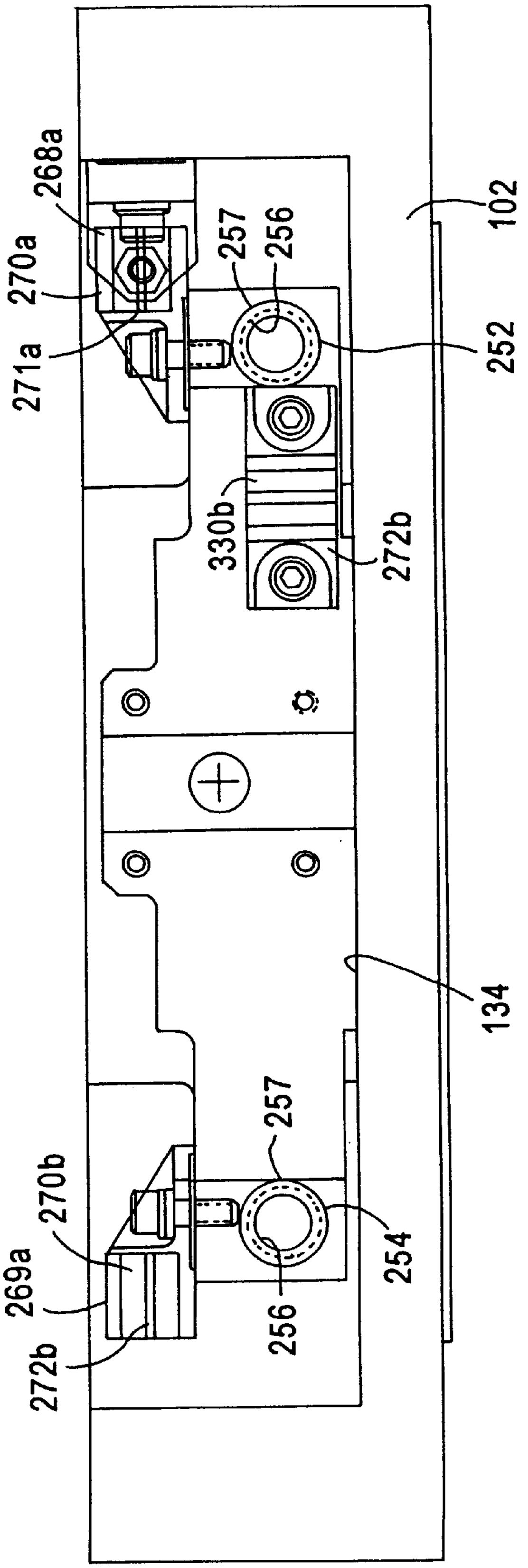
FIG. 6A is a side elevational view taken along line 10—10 with most components omitted for clarity.
Figure 10:
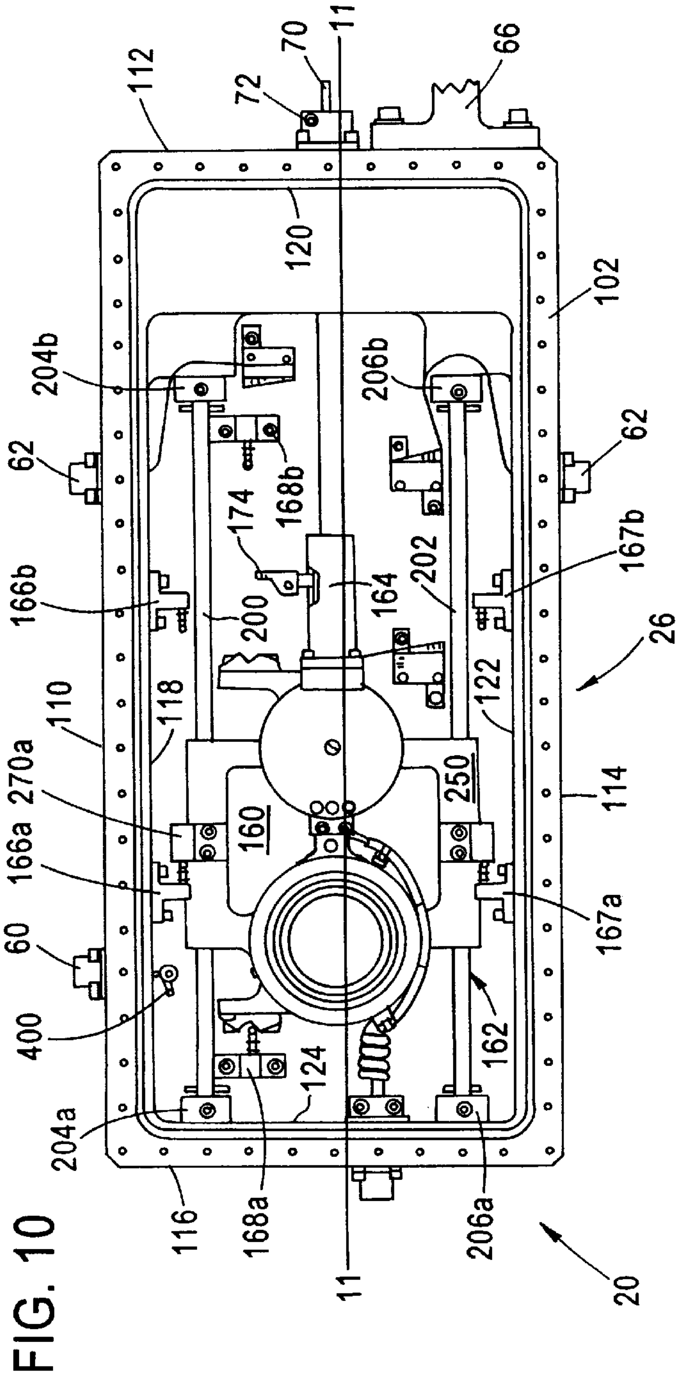
FIG. 10 is a view like FIG. 6 depicting the ambient load cell positioned in the housing through path.

As depicted in FIGS. 6 and 6A, shuttle body 250 is made of aluminum and has two bores 252, 254. Guide rails 200, 202 extend through bores 252, 254, respectively (FIG. 10). Within each bushing groove is a bushing 256. There are two bushing grooves 253*a*, 253*b* in bore 252 at opposite ends thereof and two bushing grooves 255*a*, 255*b* in bore 254 at opposite ends thereof. There is a 0.020 inch radial clearance between an inner diameter of each of the bushing grooves 255*a*, 255*b* and the outer diameter of the bushings 256 (depicted in dashed lines in FIG. 6A). The radial clearances are filled in by resilient o-rings 257. The position of the shuttle assembly 160 can be accurately aligned and does not rely on the guide rails 200, 202 for accurate positioning and alignment. Bushings 256 are preferably Oilite bushings. The two o-rings 257 are positioned on each guide rail 200, 202. Vertical locators 270*a*, 270*b* are bolted to an upper surface of shuttle assembly 160 and each have two transverse faces 268*a*, 268*b* and 269*a*, 269*b*, respectively. As depicted in FIG. 6A, on each face of the vertical locators 270*a*, 270*b* are horizontal v-slots 271*a*, 271*b*. Horizontal locators 272*a*, 272*b* are attached to shuttle assembly 160 at opposite ends thereof. A cylindrical waveguide 274, preferably made of copper, is part of shuttle assembly 160. The choke rings that form the waveguide through the shuttle assembly 160 are sized to attenuate signals in the x-band range. The waveguide 274 has a receive waveguide path. This feature allows simultaneous uplink and downlink operation of the antenna's 20 microwave systems. The RF energy present in the feed horn 22 when the transmitter is on must not be allowed to enter the receive waveguide path, because it would saturate the low noise amplifier 26 and block all downlink signals. The RF energy can penetrate the ambient load switch housing assembly 50, but the choke rings keep the RF energy out of the downlink path. The distance between the inside of the housing 50 and the shuttle assembly 160 is critical because this distance forms one of the dimensions of the choke ring and must be controlled within 0.001. Waveguide 274 has a through hole 275 through which the focused signal passes through. The waveguide 274 is centrally mounted in the transverse direction of housing 102 and on one side of the shuttle assembly 160 in the longitudinal direction.

As depicted in FIG. 7, an ambient load 278 is mounted within a recess 276 of the shuttle assembly 160 and connected thereto. A ball nut 300 is mounted within the housing 102 and is aligned with the through bore 130 and serves to guide the ball screw 70. Mounted within the ball nut assembly 164 are two balanced opposed compression springs 302, 304. A circular flange 306 is mounted between springs 302, 304. The top cover 100 plays no role in the alignment of the stops and locators and the ambient load switch assembly 26 can be assembled and calibrated with the top cover 100 removed.

Figure 8:
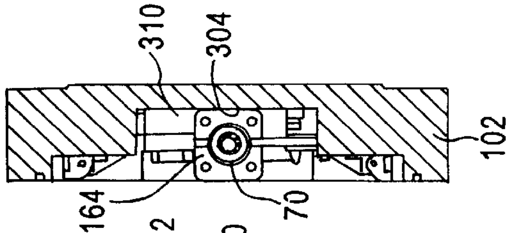
FIG. 8 is a cross-sectional side elevational view taken along line 8—8 of FIG. 6 with the waveguide aligned with the housing through path.
Figure 9:
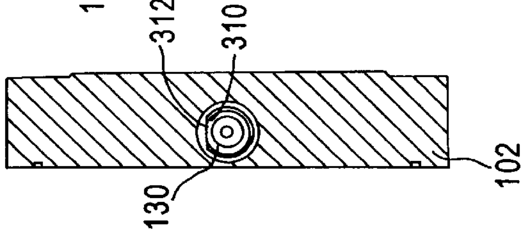
FIG. 9 is a cross-sectional side elevational view taken along line 9—9 of FIG. 6.

FIG. 8 is a cross-sectional view taken along line 8—8 of FIG. 6 and depicts slots in faces 268*b* and 269*b*, respectively. FIG. 9 is a cross-sectional view taken along line 9—9 of FIG. 6 which depicts a flat 310 on ball nut retainer 300 to clear limit switch actuator 174.

Referring to FIGS. 6 and 10, the vertical locators 166*a* and 166*b* each have a ball end 310*a*, 310*b*, 311*a*, 311*b*. Vertical locators 166*a*, 166*b* must be carefully positioned when the housing assembly 50 is assembled and adjustment is provided. Horizontal stops 168*a* and 168*b* each have ball ends 320*a* and 320*b*, respectively. Horizontal locators 272*a*, 272*b* have vertical v-grooves 330*a*, 330*b*, respectively. All of the locators 166*a*, 166*b*, 270*a*; 167*a* , 167*b*, 270*b*; 168*a*, 168*b*, 272*a*, must be carefully aligned and positioned to ensure that the shuttle assembly 160 will be properly positioned in the x, y, z directions when the waveguide 274 is aligned with the housing 50 through path and when the load element 278 is aligned with the opening 54. Each of the ball ends 310*a*, 310*b*, 311*a*, 311*b*, 320*a*, 320*b* are movable in a lateral direction during assembly.

In operation, FIG. 6 depicts shuttle assembly 160 in a first position where the waveguide 274 is aligned with through holes 106 and 54 in the housing assembly 50. In this position, the ball screw 70 is rotated by the motor assembly 56 moving the shuttle assembly and compressing spring 302. Motor assembly 56 rotates ball screw 70 until the limit switch actuator 174 actuates the limit switch 170 and shuts off the motor assembly 56. Vertical locators 270*a*, 270*b* are brought into engagement with vertical stops 166*b* and 167*b*, respectively. Simultaneously, the horizontal locator 272*b* is brought into position with horizontal stop 168*b*. The ball ends 310*a*, 311*a* and 320*a* are brought into engagement with respective v-grooves 271*a*, 272*a*, 330*b* on each of the locators 270*a*, 270*b*, 272*a* so that horizontal and vertical positioning is accurate and repeatable within one thousandth of an inch. The ball ends 310*a*, 311*a*, 320*a* are self-aligning with the v-grooves 271*b*, 272*b*, 330*a* in the horizontal x and y directions as well as the vertical z direction. Advantageously, by having the radial gap between the bushing 256 and the guide rails 200, 202 and o-rings 257 located in the radial gap, the shuttle assembly 160 can be brought into exact position. Also advantageously, neither the ball screw 70 or the motor assembly 56 needs to be braked because the spring 302 provides a biasing force to keep the shuttle assembly 160 properly positioned even if the ball screw 70 or the motor assembly 56 were to rotate. Thus, the shuttle assembly 160 is not brought into aligned positions by the motor assembly 56. Spring 302 is compressed and exerts a biasing force in the left direction as depicted in FIG. 7 so that if motor assembly 56 and ball screw 70 should rotate, the bias of spring 302 will ensure that the shuttle assembly 160 and the waveguide 275 are kept in alignment with the through path through housing assembly 50. The retractable cord 150 is extended as shown in the extended position in FIG. 6 and one side thereof rides in a groove (not shown).

Figure 11:
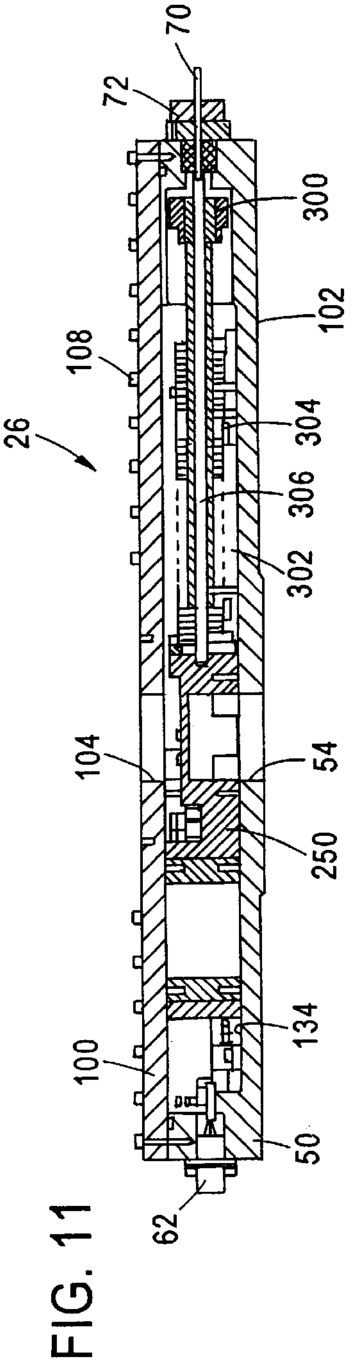
FIG. 11 is a cross-sectional view of FIG. 10 taken along line 11—11.

Shuttle assembly 160 is movable to a second position depicted in FIGS. 10 and 11 where the load element 278 is aligned with the bottom opening 54. Movement of shuttle assembly 160 from the position shown in FIGS. 6, 7 to the position shown in FIGS. 10, 11 is performed by rotation of the ball screw 70 by the motor assembly 56 in an opposite direction compressing the spring 304. Vertical locators 270*a*, 270*b* are brought into engagement with vertical locators 166*b*, 167*b*, respectively. Simultaneously, the horizontal locator 272*b* is brought into engagement with horizontal stop 168*b*. The ball ends 310*b*, 311*b* and 320*b* are brought into engagement with respective v-grooves 271*b*, 272*b*, 330*a* on each of the locators so that horizontal and vertical positioning is accurate and repeatable within one thousandth of an inch. The ball ends 310*b*, 311*b*, 320*b* are self-aligning with v-grooves 271*b*, 272*b*, 330*a*. Limit actuator 176 is brought into engagement with limit switch 172, tripping the limit actuator 172 to stop further rotation of motor assembly 56. In the second position, spring 304 is compressed and exerts a biasing force to keep the shuttle assembly 160 properly were to rotate. Spring 304 will ensure hat the load element 278 and the shuttle assembly 160 are kept in alignment with the bottom opening 54. The retractable cord 150 is retracted as shown in FIG. 10.

A temperature sensor 400 (FIGS. 6 and 10) is used to sense the temperature of the load element 278. The temperature of the load element 278 can be monitored in a known manner to vary the load and calibrate the low noise amplifier 28.

It is important that horizontal locators and vertical locators are properly aligned as the assembly is fabricated. As previously mentioned, this is done with the top cover 100 removed. Advantageously, the present invention is more reliable than prior art constructions because of the flexibility provided by relatively flexible guide shafts 200, 202 and o-rings 257 taking up a radial gap as compared to relatively rigid arrangements of the prior art. The greater flexibility of the present invention allows the present invention to flex without coming out of alignment whereas the prior art, because of the rigidity of the construction, was less reliable. Advantageously, the through path through housing assembly 50 is less than two inches long and is a straight path thereby adding much less noise to the signal than prior art ambient load waveguide switches.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A switch assembly, comprising:

a housing assembly having a through path;

a shuttle assembly positioned in said housing assembly, said shuttle assembly having a waveguide and a load element, said shuttle assembly being movable between a first position where said waveguide of said shuttle assembly is aligned with said through path of said housing assembly and a second position where said ambient load is aligned with said through path of said housing assembly;

a motor assembly operatively connected to said shuttle assembly by a linear movement device for moving said shuttle assembly between said first position and said second position.

2. The switch assembly of claim 1, further comprising two guide rails mounted to said housing assembly, said shuttle having bushings slideable on said guide rails.

3. The switch assembly of claim 2, further comprising o-rings mounted between said guide rails and said bushings.

4. The switch assembly of claim 1, wherein said housing assembly further comprises a cover, said switch assembly being operable with said cover being removed.

5. The switch assembly of claim 4, wherein said through path is less than two inches in length.

6. The switch assembly of claim 1, further comprising a first stop for stopping said shuttle assembly in said first position and a second stop for stopping said shuttle assembly in said second position.

7. The switch assembly of claim 1, wherein said linear movement device is a ball screw.

8. The switch assembly of claim 1, wherein said feed horn is mounted adjacent an input of said housing through path.

9. The switch assembly of claim 1, wherein said load element has a calibrated radiation temperature.

10. The switch assembly of claim 1, wherein said shuttle assembly can be repeatable moved into said first position within one thousandth of an inch.

11. The switch assembly of claim 1, wherein said first position and said second position have a lateral position and a vertical position.

12. The switch assembly of claim 1, further comprising a first horizontal stop for laterally positioning said shuttle assembly in said first position and a second horizontal stop for laterally positioning said shuttle assembly in said second position.

13. The switch assembly of claim 12, further comprising a first vertical positioner for vertically positioning said shuttle assembly in said first position and a second vertical positioner for vertically positioning said shuttle assembly in said second position.

14. The switch assembly of claim 1, further comprising a biasing means for biasing said shuttle assembly into said first position, said motor assembly compressing said biasing means to move said shuttle assembly into said first position.

15. The switch assembly of claim 13, wherein said shuttle assembly includes a first slot and a second slot, each to be brought into engagement with said first vertical positioner and said second vertical positioner respectively.

16. The switch assembly of claim 15, wherein said first and second vertical positioners include a ball, and said slots are vertical extending V-slots.

17. The switch assembly of claim 1, wherein said switch assembly is an x- band switch assembly.

18. The switch assembly of claim 1, wherein the first position and the second position are independently adjustable.

19. The switch assembly of claim 3, wherein there is a radial clearance between said bearing and said shuttle housing, said o-rings filling said radial clearance.

* * * * *